United States Patent [19]

Frank

[11] 4,260,161

[45] Apr. 7, 1981

[54] ARRANGEMENT FOR VIBRATIONLESS COUPLING OF A PHONOGRAPH RECORD WITH THE TURNTABLE OF A PHONOGRAPH

[75] Inventor: Reinhard Frank, Embühren, Fed. Rep. of Germany

[73] Assignee: Sound-Source International, Amstelveen, Netherlands

[21] Appl. No.: 37,411

[22] Filed: May 9, 1979

[30] Foreign Application Priority Data

May 11, 1978 [DE] Fed. Rep. of Germany ... 7814262[U]

[51] Int. Cl.³ .............................................. G11B 3/60
[52] U.S. Cl. ..................... 369/58; 369/270; 369/271
[58] Field of Search ................. 274/39 R, 39 A, 1 K, 274/1 R

[56] References Cited

U.S. PATENT DOCUMENTS 3,997,174  12/1976  Kawashima ...................... 274/39 R

FOREIGN PATENT DOCUMENTS 695978  12/1930  Fed. Rep. of Germany .......... 274/1 K Primary Examiner—Steven L. Stephan
Attorney, Agent, or Firm—Max Fogiel

[57] ABSTRACT

An arrangement for vibrationless coupling of a phonograph record with the turntable of a phonograph, having a liner for placing between turntable and phonograph record and a center contact member placed over the centering pin of the turntable. The liner is made of acoustically inert material. It has indentations beveled at the rims for receiving thicker portions of the record. The record contact region for the modulated portion of the record increases in thickness from the inside towards the outside. The center contact member may have the form of a truncated cone with a cylindrical stump having a diameter smaller than the smooth center area of the record and the contact area may also have a centered recess. A spirit level clinometer may be centered in the flat area of the truncated cone. A stroboscope may be provided on the outer periphery of the cylindrical stump of the center contact member.

5 Claims, 3 Drawing Figures

ARRANGEMENT FOR VIBRATIONLESS COUPLING OF A PHONOGRAPH RECORD WITH THE TURNTABLE OF A PHONOGRAPH

The invention relates to an arrangement for the vibrationless coupling of a phonograph record with the turntable of a phonograph.

It is known that during the playing of phonograph records an unaligned and inadequate contact of the phonograph record with the turntable of a phonograph causes the airborne sound to set the phonograph record in vibrations which cause distortions during the sound reproduction which might be quite bothersome depending on the phonograph record quality. The unaligned and inadequate contact of the phonograph record on the turntable causes additional vibrations of the phonograph record so that a certain superposition of interfering influences takes place. In order to avoid these interferences or reduce them to a minimum, various proposals have become known. For example, a device is placed on the centering pin of the turntable with a spirit level clinometer which indicates the position of the record. This arrangement, however, is an indicator for the unaligned position so that an alignment can be made, but no adequate coupling of the record with the turntable is achieved, and a reproduction distortion due to vibrations is not avoided.

Another proposal provides a replacement of the turntable liner, with this turntable liner being made of a material lighter and harder than aluminum. This liner is slightly bent inward in the center, hence in the region of the label portion of the record, which is to eliminate vibrations of the record.

However, these known possibilities for eliminating bothersome vibrations of the record and for obtaining perfect contact of the record on the turntable have not been able to solve the existing problem in the desired manner.

It is the object of the invention to provide an arrangement for the vibrationless coupling of a phonograph record with the turntable of a phonograph.

SUMMARY OF THE INVENTION

This object is achieved according to the invention by providing an arrangement consisting of a liner for the record and a device placed on it over the center pin of the turntable and applying a load on the record, with the record liner to be placed directly on the turntable consisting of an acoustically inert material and equipped with identations beveled on the rims. These indentations serve to receive the thicker portion of the record as soon as the recording range of the modulated part of the phonograph record is strengthened from the inside to the outside.

As a result, the record with its modulated portion contacts the slightly conical portion of the record liner; influencing the tone by vibrations during reproduction is eliminated, because only this slightly conical design of the liner region in conjunction with the load and coupling arrangement assures the satisfactory contact of the modulated region of the record.

Furthermore, the arrangement, to be placed on the record in the form of a truncated cone or the like with cylindrical stump whose diameter is smaller than the smooth center surface of the record and whose contact surface is provided with a centric recess, achieves that the arrangement contacts the record only with the outer rim of the underside of the cylindrical stump and thus presses the record firmly against the record liner by its weight. In order to check the perfect alignment of the record, a spirit level clinometer is inserted in the center of the truncated cone surface. Furthermore, to check the peripheral speed of the record, the outer circumference of the cylindrical stamp can be equipped with a stroboscope so that possible speed deviations may be detected and remedied. Further properties and advantages of the invention are apparent from the description in conjunction with the drawing of an embodiment.

DESCRIPTION OF THE PREFERRED EMBODIMENTS

Figure 1:
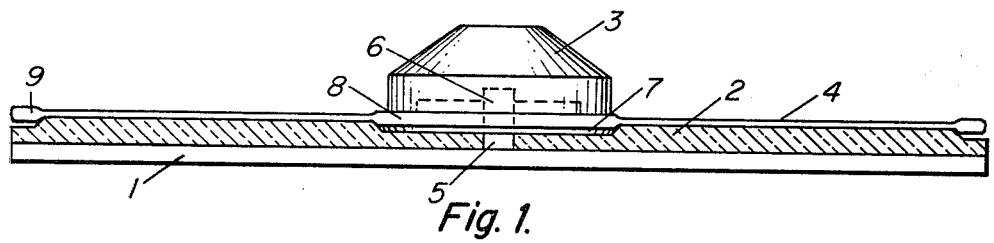
FIG. 1 shows a sectional view of the arrangement.
Figure 2:
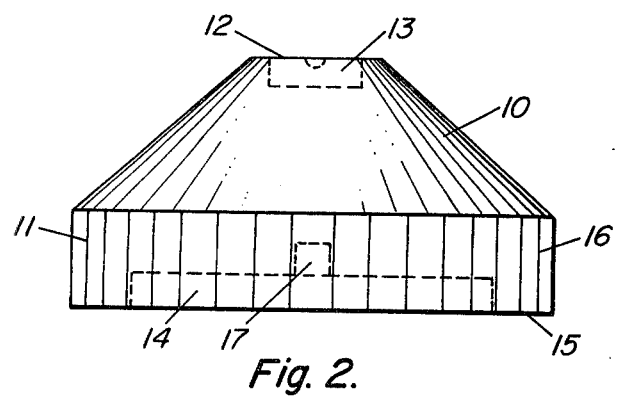
FIG. 2 shows a side view of the coupling device to be placed on the record.
Figure 3:
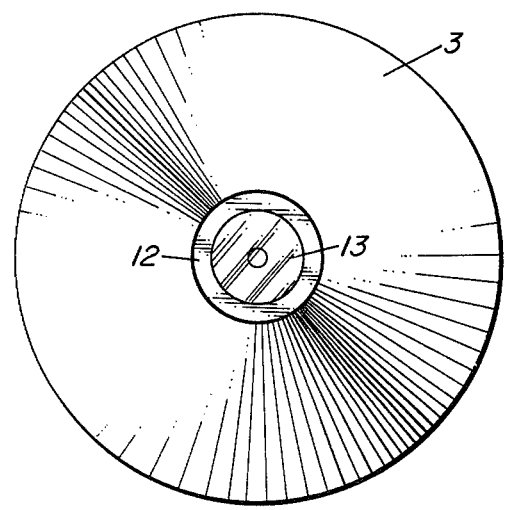
FIG. 3 shows a top view of FIG. 2.

The turntable 1 of a phonograph has a liner 2 on which the record 4 loaded by an arrangement 3 is placed.

The liner 2 consists of an acoustically inert material and has a center hole 5 for the center pin 6 of the turntable 1. Furthermore, the liner 2 has a centered indentation 7 whose rim is beveled and is used for receiving the portion 8, bearing a label, of record 4. The contact region adjacent to this indentation 7 of liner 2 for record 4 is constructed to increase in thickness towards the outside and is again set off at the rim by a bevel so that the thicker rim 9 of the record 4 is free.

In order to ensure firm contact of record 4, it is loaded with an arrangement 3 which practically serves as coupling. This arrangement is advantageously made from a relatively heavy material, it consists of a conic-frustum shaped portion 10 and a cylindrical stump 11. A spirit level clinometer 13 is inserted into the flat surface 12 of the conic-frustum 10.

The cylindrical stump 11 on the contact surface has a recess 14 so that the contact area is only the remaining rim 15. On the outer periphery is a stroboscope 16 on the cylindrical stump 11 in order to monitor the peripheral speed.

In the center of recess 14 of the cylindrical stump 11 is a blind hole 17 for placing the arrangement 3 on the center pin 6 of turntable 1.

In another embodiment of arrangement 3 a through-going hole is provided for centering instead of a blind hole so that the arrangement may also be placed on the record with the surface opposite rim 15.

I claim:
1. An arrangement for vibrationless coupling of a phonograph record with a turntable comprising: a turntable; a liner support placed on said turntable underneath the record; a center contact member placed over a centering pin of said turntable for loading said phonograph record by applying pressure thereto, said liner support being of acoustically inert material and having indentations beveled at rims of said liner, said indentations receiving thicker portions of said phonograph record; a record contact region for a modulated portion of said phonograph record increasing in thickness from inside towards outside of said turntable; said modulated portion only lying on said liner support; said center contact member pressing only on a portion of said record bearing a label, said vibrationless coupling being a two-part coupling comprising said liner support and said center contact member, said liner support having a substantially solid interior free of fluid containing cavities.

2. An arrangement as defined in claim 1, wherein said center contact member has the form of a truncated cone with a cylindrical stump having a diameter smaller than the smooth center area of said record, said cylindrical stump having a contact area with a centered recess.

3. An arrangement as defined in claim 2 including a spirit level clinometer in center flat area of said truncated cone.

4. An arrangement as defined in claim 2 including a stroboscope on an outer periphery of said cylindrical stump portion of said center contact member.

5. An arrangement as defined in claim 1, wherein said center contact member has the form of a truncated cone with a cylindrical stump having a diameter smaller than the smooth center area of said record, said cylindrical stump having a contact area with a centered recess; a spirit level clinometer in center flat area of said truncated cone; a stroboscope on an outer periphery of said cylindrical stump portion of said center contact member.

* * * * *